US009503843B2

(12) United States Patent
Tofighbakhsh

(10) Patent No.: US 9,503,843 B2
(45) Date of Patent: Nov. 22, 2016

(54) METHOD AND APPARATUS FOR SENDING A REQUEST TO LOCATE AN INDIVIDUAL VIA A TEXT MESSAGE

(71) Applicant: AT&T Intellectual Property I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 14/079,539

(22) Filed: Nov. 13, 2013

(65) Prior Publication Data

US 2015/0133158 A1    May 14, 2015

(51) Int. Cl.
*H04W 4/02*    (2009.01)

(52) U.S. Cl.
CPC .............. *H04W 4/02* (2013.01); *H04W 4/023* (2013.01)

(58) Field of Classification Search
None
See application file for complete search history.

(56) References Cited

U.S. PATENT DOCUMENTS

| 7,257,416 | B2 * | 8/2007 | Lee ....................... H04W 64/00 455/433 |
| 7,353,034 | B2 | 4/2008 | Haney |
| 8,055,277 | B2 | 11/2011 | Park et al. |
| 8,103,250 | B2 | 1/2012 | Sullivan et al. |
| 8,160,606 | B2 | 4/2012 | Shrivathsan et al. |
| 8,165,799 | B2 | 4/2012 | Snavely et al. |
| 8,364,167 | B1 * | 1/2013 | Sylvain ................. H04W 4/023 455/456.1 |
| 8,374,628 | B1 | 2/2013 | Nelissen et al. |
| 8,391,893 | B2 | 3/2013 | Mcnamara et al. |
| 8,396,488 | B2 | 3/2013 | Doyle |
| 8,417,261 | B2 | 4/2013 | Huston |
| 8,504,065 | B2 | 8/2013 | Ku et al. |
| 8,565,788 | B2 | 10/2013 | Houri |
| 2002/0169539 | A1 | 11/2002 | Menard et al. |
| 2008/0171555 | A1 * | 7/2008 | Oh et al. ..................... 455/456.1 |

(Continued)

FOREIGN PATENT DOCUMENTS

| EP | 1148754 A2 * | 10/2001 | ............... H04Q 7/38 |
| EP | 1486910 A2 | 12/2004 | |

OTHER PUBLICATIONS

Palazzi, Claudio Enrico. "Buddy-Finder: A proposal for a novel entertainment application for GSM." Global Telecommunications Conference Workshops, 2004. GlobeCom Workshops 2004. IEEE. http://www.math.unipd.it/~cpalazzi/papers/Palazzi_Buddy_Finder_NIME04.pdf.

(Continued)

*Primary Examiner* — Kimberly A Williams

(57) ABSTRACT

A method, computer-readable storage device and apparatus for processing a text message are disclosed. For example, the method receives the text message, analyzes the text message for an indication that a sender of the text message is requesting location information of an individual that the text message is addressed to, receives a permission to provide the location information of the individual receiving the text message, and transmits the location information of the individual to an endpoint device of the sender, wherein the location information of the individual is continually updated and sent to the endpoint device of the sender.

20 Claims, 3 Drawing Sheets

(56) References Cited

U.S. PATENT DOCUMENTS

| | | | | |
|---|---|---|---|---|
| 2008/0268870 | A1* | 10/2008 | Houri | G01S 5/0252 455/456.1 |
| 2009/0170525 | A1* | 7/2009 | Baghdasaryan | 455/456.1 |
| 2009/0254840 | A1* | 10/2009 | Churchill et al. | 715/753 |
| 2010/0029302 | A1* | 2/2010 | Lee et al. | 455/456.6 |
| 2010/0077484 | A1 | 3/2010 | Paretti et al. | |
| 2010/0279712 | A1 | 11/2010 | Dicke et al. | |
| 2010/0317368 | A1* | 12/2010 | Augst | H04W 4/16 455/456.1 |
| 2011/0021211 | A1* | 1/2011 | Ohki | 455/456.3 |
| 2011/0070865 | A1* | 3/2011 | Nelson | G01S 5/0205 455/411 |
| 2011/0143774 | A1* | 6/2011 | McNamara | H04W 4/02 455/456.2 |
| 2012/0265823 | A1* | 10/2012 | Parmar | H04W 4/02 709/206 |
| 2013/0184010 | A1* | 7/2013 | Lagnado | G01C 21/20 455/456.2 |
| 2013/0226453 | A1* | 8/2013 | Trussel et al. | 701/533 |
| 2014/0099973 | A1* | 4/2014 | Cecchini et al. | 455/456.3 |
| 2014/0329548 | A1* | 11/2014 | Tharshanan et al. | 455/457 |

OTHER PUBLICATIONS

Loukas, Athanasios, et al. "MILC: A secure and privacy-preserving mobile instant locator with chatting." Information Systems Frontiers 14.3 (2012): 481-497. http://www.icsd.aegean.gr/publication_files/journal/37424523.pdf.

He, Qi, Dapeng Wu, and Pradeep Khosla. "The quest for personal control over mobile location privacy." Communications Magazine, IEEE 42.5 (2004): 130-136. http://islab.iecs.fcu.edu.tw/GroupMeeting/PowerPoint/20040924_1.pdf.

* cited by examiner

METHOD AND APPARATUS FOR SENDING A REQUEST TO LOCATE AN INDIVIDUAL VIA A TEXT MESSAGE

The present disclosure relates generally to location services and, more particularly, to a method and apparatus for sending a request to locate an individual via a text message.

BACKGROUND

There are instances when an individual would like to locate another individual. Currently, even when both individuals mutually agree to locate one another, the process may be difficult or inconvenient. For example, some methods may require that each user download and install an application on his or her respective mobile endpoint device to enable such a service. In another embodiment, the individuals may be required to adjust various settings on a network subscription level and each individual mobile endpoint device to enable such a location feature. Thus, the currently deployed methods for requesting and providing location information of another user may not be desirable.

SUMMARY

In one embodiment, the present disclosure provides a method, computer-readable storage device, and an apparatus for processing a text message. In one embodiment, the method receives the text message, analyzes the text message for an indication that a sender of the text message is requesting location information of an individual that the text message is addressed to, receives a permission to provide the location information of the individual receiving the text message, and transmits the location information of the individual to an endpoint device of the sender, wherein the location information of the individual is continually updated and sent to the endpoint device of the sender.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for sending a request to locate an individual via a text message. As discussed above, there are instances when an individual would like to locate another individual. Currently, even when both individuals mutually agree to locate one another, the process may be difficult or inconvenient. For example, some methods may require that each user download and install an application on his or her respective mobile endpoint device to enable such a service. In another embodiment, the individuals may be required to adjust various settings such as making a network subscription level change and/or making a change on the individual mobile endpoint device to enable such a location feature. Thus, the currently deployed methods for requesting and providing location information of another user may not be desirable.

One embodiment of the present disclosure provides a method and system to allow a user to send a request to locate an individual via a text message. Currently, text messaging may use short message services (SMS) to send brief instant messages to known contacts. Text messaging is not device, platform or operating system specific and is ubiquitously available. In addition, text messaging is relatively secure and inexpensive.

By leveraging text messaging to send requests to locate an individual, no additional software or applications need to be downloaded onto the users' endpoint devices. For example, unlike some current methods, if one user downloads an application but none of the user's contacts also download the application, the service may be unavailable.

In addition, by leveraging text messaging to send requests to locate an individual, there may be an initial level of security. For example, individuals may know that they will likely only receive requests for his or her location from known contacts. In other words, strangers will generally not know the individual's telephone number of his or her mobile endpoint device to send them a text message requesting his or her location.

Figure 1:
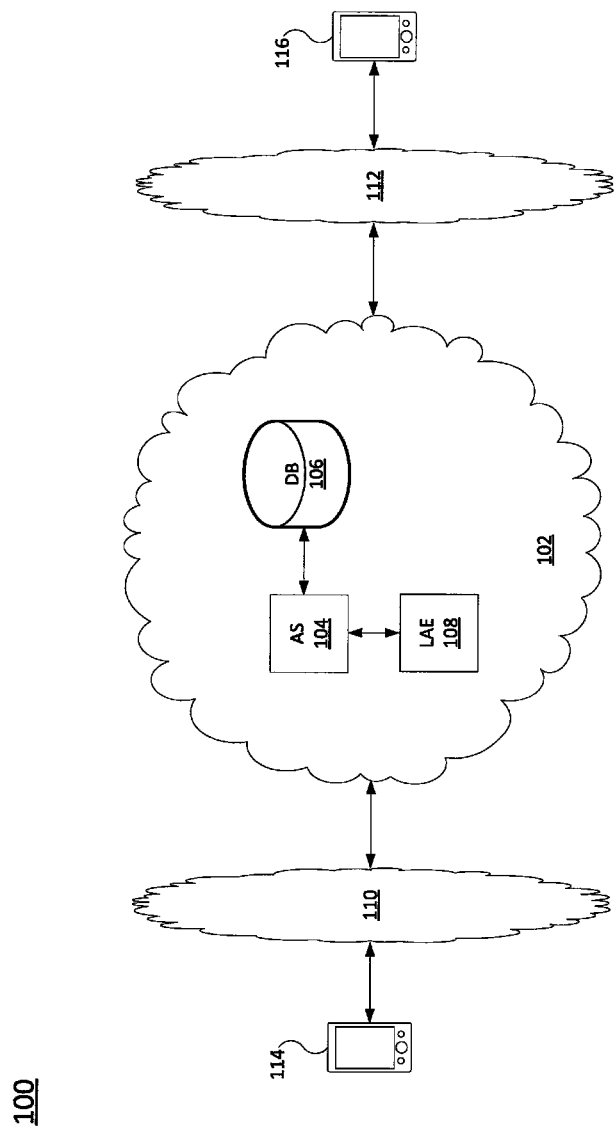
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

In one embodiment, the communications network 100 may include a core network 102. The core network 102 may include an application server (AS) 104, a database (DB) 106 and a location authentication engine (LAE) 108. The AS 104 may be deployed as a hardware device embodied as a general purpose computer (e.g., the general purpose computer 300 illustrated in FIG. 3). In one embodiment, the AS 104 may perform the methods and functions described herein (e.g., the method 200 discussed below).

In one embodiment, the AS 104 may include a short message service center (SMSC) to manage the delivery and submission of SMS text messages sent over the communications network 100. In one embodiment, the AS 104 may include a natural language processor or keyword dictionary to identify one or more pre-defined key words or phrases used to identify that the text message is requesting a location service to locate an individual, as will be discussed below.

In one embodiment, the DB 106 may store information about each subscriber. For example, the DB 106 may also serve as a home location register (HLR) providing administrative information on all registered subscribers of the communication network 100. The DB 106 may also store pre-defined user policies that include information about when permissions for providing location information expire.

For example, permission may be granted to a sender to receive location information of an individual, as will be discussed below. However, the permission may expire in accordance with the pre-defined user policy of the individual. The user policy may set a pre-defined time period (e.g., the requestor has two hours to find me using the provided location information) of when the permission expires, a pre-defined distance (e.g., within a close proximity, when a confirmation is received that the requestor is at the same location as the individual, within 100 feet, 100 yards, 1 mile, and the like) of when the permission expires, and the like.

In one embodiment, the LAE 108 may track which individual has provided permission to provide location information to which requestors. The LAE 108 may also obtain location information of the individuals and provide the location information to the AS 104 for sending to the requestor or sender of the text message request.

In one embodiment, the communications network may include one or more access networks 110 and 112 (e.g., a cellular network, a wireless network, a Wi-Fi network, a PSTN network, an IP network, and the like). In one embodiment, the communications network 100 in FIG. 1 is simplified and it should be noted the communications network 100 may also include additional network elements (not shown), such as for example, border elements, gateways, routers, switches, call control elements, various application servers, and the like.

In one embodiment, the communications network 100 may include mobile endpoint devices 114 and 116. Although only two mobile endpoint devices are illustrated in FIG. 1, it should be noted that any number of mobile endpoint devices may be deployed. In one embodiment, the mobile endpoint device may be any mobile endpoint device, such as for example, a smart phone, a cellular telephone, a laptop computer, a tablet computer, or any other type of mobile computing device having text messaging capability, e.g., SMS text messaging capability.

In one embodiment, the mobile endpoint devices 114 and 116 may be used to send and receive text messages via the SMS service provided by the communications network 100 and used to locate an individual. For example, the mobile endpoint devices 114 and 116 may be enabled with a global positioning system (GPS). The GPS may collect location data that may be sent to the LAE 108. In another embodiment, the location of the mobile endpoint devices 114 and 116 may be obtained by using triangulation of nearby base stations or cell towers. The triangulation may be performed by the LAE 108 using information received from the base stations or cell towers. In another embodiment, the location may be obtained by finding an address of where the mobile endpoint device 114 and 116 are located. It should be noted that only a few examples are provided above, but any location or tracking method may be deployed to obtain the location of the mobile endpoint devices 114 and 116.

In one embodiment, the mobile endpoint devices 114 and 116 may also be equipped with SMS entities or modules that allow the mobile endpoint devices 114 and 116 to send and receive text messages. In one embodiment, the user of the mobile endpoint device 114 may want to know a location of the individual associated with the mobile endpoint device 116. For example, the user of the mobile endpoint device 114 may be a husband (broadly a first user) and the user of the mobile endpoint device 116 may be a wife (broadly a second user). The husband may want to know where the wife is so he can find her in the city as they have split up to temporarily shop separately.

In one embodiment, the husband may send a text message via SMS using the mobile endpoint device 114 to the mobile endpoint device 116 of the wife. The text message may read "where r u honey?" The AS 104 may intercept the text message and analyze the text message. The AS 104 may detect the key phrase "where r u" and initiate a sequence to provide a location service.

The AS 104 may use other key words and phrases, such as for example, "where," "location," "find you," "where are you," "what is your location," "can I find you," "are you nearby," "are you here yet," and the like. The phrases listed above are provided only as examples and it should be recognized that any number of key words or key phrases may be used or defined.

In another embodiment, the husband may send a text message with a special code before the message. For example, the code may be *50 or *LSR for "location service request," and the like. Any combination of alphanumeric characters or symbols may be used to create the special code associated with the location services (e.g., "*50, can I find you"). In one embodiment, the AS 104 may analyze the text message to look for a pre-defined special code indicating that the mobile endpoint device 114 is requesting location information of an individual.

In another embodiment, the mobile endpoint device 114 may recognize the text message is requesting a location service using key words, key phrases or a pre-defined special code and insert a bit into the text message. The AS 104 may receive the text message with the inserted bit or character(s) indicating that the location service is being requested to initiate the sequence for providing the location of an individual.

In one embodiment, when the AS 104 initiates the sequence to provide location services, the AS 104 may send a message to the mobile endpoint device 114 to confirm that the husband is requesting the location service to obtain the location of his wife via the mobile endpoint device 116. Once the AS 104 receives confirmation from the mobile endpoint device 114, the AS 104 may send the text message from the mobile endpoint device 114 and an additional message to the mobile endpoint device 116 notifying the wife that her husband is requesting her location information. Alternatively, the notification may be included with the original text message from the mobile endpoint device 114.

In one embodiment, the wife may grant permission for the communications network 100 to provide her location information to her husband. In one embodiment, the AS 104 may grant the permission to the mobile endpoint device 114 in accordance with a policy defined by the wife. For example, the permission may be in the form of a token stored on the mobile endpoint device.

The policy may define when the permission or the token expires. For example, the wife may define the permission for close family members to never expire. In another embodiment, the wife may define permissions for all contacts in her address book to expire in 2 hours or when they are within 100 feet of her indicating that the requestor has located her.

In one embodiment, the AS 104 may obtain the location information of the wife from the LAE 108. For example, the LAE 108 may obtain the location information via GPS from the mobile endpoint device. In another embodiment, the LAE 108 may obtain location information via a triangulation between the mobile endpoint device 116 and multiple base stations. In another embodiment, the LAE 108 may obtain an address associated with a location of the mobile endpoint device 116 from a location tracking method that is enabled on the mobile endpoint device 116. It should be noted that the above methods of obtaining location information is only illustrative and should not be considered limiting. Any type of method may be used to obtain the location information of the mobile endpoint device 116.

In one embodiment, the AS 104 may obtain the location information of the mobile endpoint device 116 and send the location information as a text message to the mobile endpoint device 114. For example, the text message may include an address including turn-by-turn directions. In another embodiment, the text message may include GPS coordinates including turn-by-turn directions.

In another embodiment, the location information may be provided by sending a signal to the mobile endpoint device 114 instructing the mobile endpoint device 114 to open a map application. The map application may provide a first marker on a map of the city indicating a location of the mobile endpoint device 116. The map application may also include a second marker on the same map of the city indicating a location of the mobile endpoint device 114. The map application may also provide turn-by-turn directions or a path between the two mobile endpoint devices. The map application may track the movement of the mobile endpoint device 114 and the mobile endpoint device 116 as the two mobile endpoint devices 114 and 116 move around an area, e.g., the city. Typically, maps only display a single moving marker indicating a location of a single mobile endpoint device and do not typically display a map having multiple moving objects on the map. As a result, one embodiment of the present disclosure pertains to the manner that the location information is presented to the husband so that he can track how close he is getting to his wife via the map application.

In one embodiment, the location information may be provided continuously to the mobile endpoint device 114 as long as the permission has not expired. For example, text messages may be periodically updated or continuously updated as the mobile endpoint device 116 is moving. In addition, the location information may be continuously provided so that the map application can continuously update where the mobile endpoint device 116 is on the map application. However, if the permission expires, then no additional location information may be sent.

In one embodiment, the AS 104 may also calculate an estimated time of arrival of the mobile endpoint device 116 and/or a distance remaining or distance away of the mobile endpoint device 116. The additional information may be useful for the user of the mobile endpoint device 114 requesting the location information (e.g., the husband may determine that he will not arrive in time at her location, e.g., for both of them to catch a train, if he continues to walk to his wife's location or maybe he should instead take a cab based upon the distance or estimated time of arrival, and the like).

In one embodiment, the mobile endpoint device 116 may request a cancellation of the permission at any time on demand. For example, the wife may want to make another purchase in a store without letting her husband know. The wife may send a request to cancel the permission to provide her location information immediately to her husband via her mobile endpoint device 116. For example, the wife may send a text message "stop" to the AS 104 using her mobile endpoint device 116 or some other similar commands. The AS 104 may then send a message to the mobile endpoint device 114 informing the husband that the location information is no longer available or that the location service has been terminated by the other user.

In one embodiment, the mobile endpoint device 116 may re-initiate providing location information to the mobile endpoint device 114 at a later time. In other words, the cancellation request sent by the mobile endpoint device 116 may "pause" sending the location information to the mobile endpoint device 114 temporarily. Said another way, the mobile endpoint device 114 does not need to send another request to obtain location information of the mobile endpoint device 116 if the mobile endpoint device 116 subsequently grants permission again within a pre-defined time period (e.g., 5 minutes, 15 minutes, one hour and the like).

Thus, one embodiment of the present disclosure allows a user to request a location of an individual by simply sending a text message. For example, the user does not need to download and install a separate application or call the service provider to request a specific service. Rather, the user may initiate the request for a location service "on the fly" simply by texting an individual and using a key word, a key phrase, or a pre-defined code.

Figure 2:
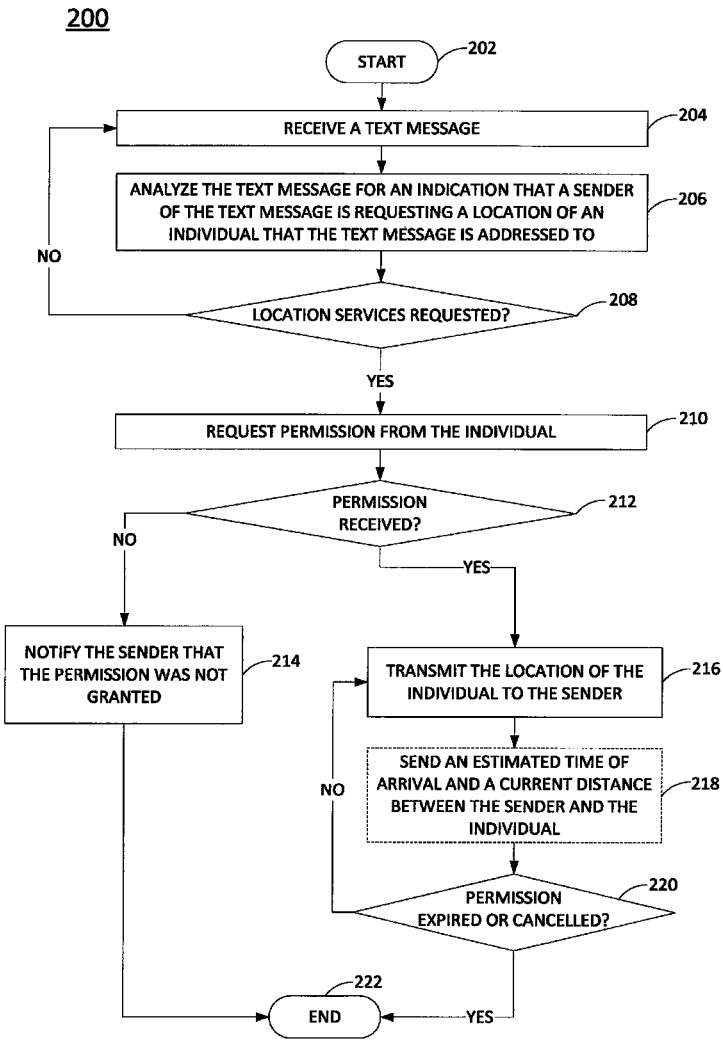
FIG. 2 illustrates an example flowchart of a method for establishing an ad hoc communications with an unknown contact.
Figure 3:
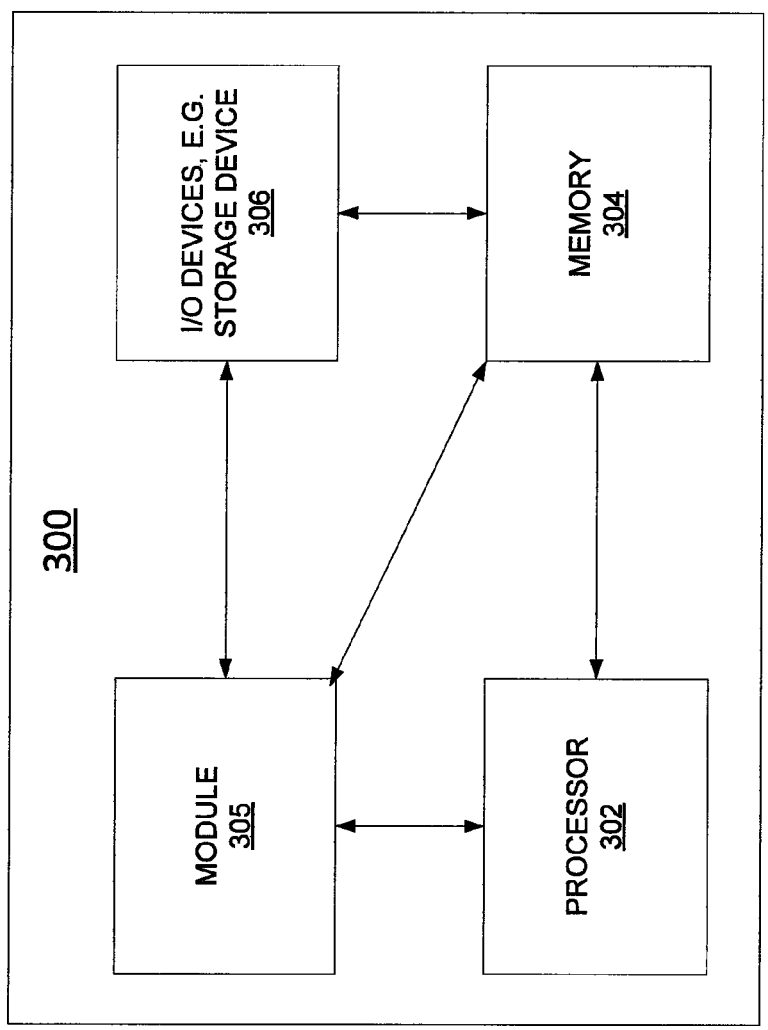
FIG. 3 illustrates a high-level block diagram of a general-purpose computer suitable for use in performing the functions described herein.

FIG. 2 illustrates a flowchart of a method 200 for processing a text message to provide a location service. In one embodiment, the method 200 may be performed by the AS 104 or a general purpose computer as illustrated in FIG. 3 and discussed below.

The method 200 begins at step 202. At step 204, the method receives a text message. For example, the text message may be a SMS text message. It should be noted that a text message using other messaging services or protocols outside of SMS is within the scope of the present disclosure. The text message may be transmitted by a communications network, but an application server or a short message service center (SMSC) may intercept the message during transmission to quickly examine the words in the text message.

At step 206, the method 200 analyzes the text message for an indication that a sender of the text message is requesting a location of an individual that the text message is addressed to. In one embodiment, the text message may read "where r u honey?" The method 200 may analyze the text message to detect the key phrase "where r u" and initiate a sequence to provide a location service.

In one embodiment, the method 200 may use other key words and phrases, such as for example, "where," "location," "find you," "where are you," "what is your location," "can I find you," "are you nearby," and the like. The phrases listed above are provided only as examples and it should be recognized that any number of other key words or key phrases may be used or defined.

In another embodiment, a text message with a special code before the message may be sent. For example, the code may be *50 or *LSR for representing a "location service request," and the like. Any combination of alphanumeric characters or symbols may be used to create the special code associated with the location services. In one embodiment, the method 200 may analyze the text message to look for a pre-defined special code indicating that the sender is requesting location information of an individual.

At step 208, the method 200 determines if one or more location services are being requested by the sender. If method 200 determines that a location service is not being requested by the sender, then the method 200 may return to step 204 to receive another text message. If the method 200 determines that a location service is being requested by the sender, the method 200 may proceed to step 210.

At step 210, the method 200 requests permission from the individual. For example, the received text message and an additional text message may be sent to the recipient individual indicating that the sender is requesting permission for the location of the recipient individual.

At step 212, the method 200 determines if permission was received from the recipient individual. If permission was not granted, the method 200 may proceed to step 214. At step 214, the method 200 may send a text message to the sender notifying the sender that the permission was not granted. The method 200 may then proceed to step 222 where the method 200 ends.

However, if permission is granted at step 212 from the recipient individual, the method 200 may proceed to step 216. At step 216, the method 200 may transmit the location (broadly referred to as location information) of the recipient individual to the sender. In one embodiment, the location of the recipient individual may be the location of the recipient individual's mobile endpoint device.

In one embodiment, the location information of the recipient individual may be sent as a text message to the sender. The text message may include an address including turn-by-turn directions. In another embodiment, the text message may include GPS coordinates including turn-by-turn directions.

In another embodiment, the location information may be provided by sending a signal to the mobile endpoint device of the sender instructing the mobile endpoint device of the sender to open a map application. The map may provide a first marker on the map application indicating a location of the mobile endpoint device of the recipient individual. The map application may also include a second marker indicating a location of the mobile endpoint device of the sender. The map application may also provide turn-by-turn directions. As the map application may track the movement of the sender's mobile endpoint device and the recipient individual's mobile endpoint device as the two mobile endpoint devices move around. Notably, typically maps only display a single moving marker indicating a location of a single mobile endpoint device and do not typically display a map having multiple moving objects on the map. As a result, the sender can track how close he or she is getting to the recipient individual via the map application.

At step 218, the method 200 may optional also send an estimated time of arrival and/or a current distance between the sender and the recipient individual. For example, the sender may receive another text message or the estimated time of arrival and/or current distance may be provided in the same text message containing the location information.

At step 220, the method 200 determines if the permission has expired or a cancellation request was received. For example, the permission may be granted in accordance with a pre-defined user policy. The pre-defined user policy may define when the permission will expire. In one embodiment, the pre-defined user policy may provide different expirations for different groups of people (e.g., no expiration for family members, a time limit for contacts in an address book or contact list, and the like).

In one embodiment, the expiration may be based upon a time limit (e.g., 1 hour, 2 hours, 1 day, and the like). In another embodiment, the expiration may be based on a close proximity (e.g., within 10 feet, within 100 feet, within 0.5 miles, and the like).

In one embodiment, the recipient individual may send a cancellation request on demand to terminate the location service being provided to the sender. For example, the recipient individual may be a buyer that carelessly provided permission to five different salesmen at a conference location to obtain a location of the buyer. However, the buyer may cancel the permission for four out of five of the salesmen, when the first salesman reaches the buyer.

If the permission has not expired or no cancellation was received, the method 200 may return to step 216. In other words, the method 200 may continuously provide location information to the sender via the loop 216, 218 and 220 as long as the permission does not expire or no cancellation request is received. For example, if the location of the recipient individual changes (e.g., closer to the sender, away from the sender, and the like), the method 200 may continuously transmit the location of the recipient individual via additional text messages or as an animation on the map application showing the individual moving in the map application.

However, at step 220 if the permission has expired or a cancellation request was received, the method may proceed to step 222. The method 200 ends at step 222.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for sending a request to locate an individual via a text message, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for sending a request to locate an individual via a text message (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for sending a request to locate an individual via a text message (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a first text message, the method comprising:
   receiving, by a processor in an application server deployed in a communication network and over the communication network, the first text message;
   analyzing, by the processor, the first text message for an indication that a sender of the first text message is requesting location information of an endpoint device of an individual that the first text message is addressed to;
   receiving, by the processor, a permission to provide the location information of the endpoint device of the individual;
   obtaining, by the processor, the location information of the endpoint device of the individual from a network device deployed in the communication network; and
   transmitting, by the processor and over the communication network, the location information of the endpoint device of the individual to an endpoint device of the sender via a plurality of text messages, wherein the location information of the endpoint device of the individual is updated for each of the plurality of text messages and sent to the endpoint device of the sender, wherein the endpoint device of the individual is distinct from the network device.

2. The method of claim 1, wherein the first text message comprises a short message service text message.

3. The method of claim 1, wherein the indication comprises a key word.

4. The method of claim 1, wherein the indication comprises a predefined code in the first text message.

5. The method of claim 1, wherein the permission expires in accordance with a user defined policy.

6. The method of claim 5, wherein the user defined policy defines a time period before the permission expires.

7. The method of claim 5, wherein the user defined policy defines a distance before the permission expires.

8. The method of claim 1, wherein the location information comprises an address and turn-by-turn directions that are included in each of the plurality of text messages that is sent to the endpoint device of the sender.

9. The method of claim 1, wherein the location information comprises global positioning system coordinates and turn-by-turn directions that are included in each of the plurality of text messages that is sent to the endpoint device of the sender.

10. The method of claim 1, wherein the location information is provided in a map application that is launched on the endpoint device of the sender with turn-by-turn directions.

11. The method of claim 10, wherein the map application includes a first marker showing a location of the endpoint device of the sender and a second marker showing a location of the endpoint device of the individual and wherein the map application tracks the first marker relative to the second marker as the endpoint device the sender moves closer to the location of the endpoint device of the individual.

12. The method of claim 1, further comprising:
    sending, by the processor, an estimated time of arrival and a current distance between the endpoint device of the sender and the endpoint device of the individual.

13. The method of claim 1, further comprising:
    receiving, by the processor, a request to cancel the permission; and
    terminating, by the processor, a transmission of the location information of the endpoint device of the individual to the endpoint device of the sender.

14. A non-transitory computer-readable storage device storing a plurality of instructions which, when executed by a processor in an application server deployed in a communication network, cause the processor to perform operations for processing a first text message, the operations comprising:
    receiving over the communication network the first text message;
    analyzing the first text message for an indication that a sender of the first text message is requesting location information of an endpoint device of an individual that the first text message is addressed to;
    receiving a permission to provide the location information of the endpoint device of the individual;
    obtaining the location information of the endpoint device of the individual from a network device deployed in the communication network; and
    transmitting over the communication network the location information of the endpoint device of the individual to an endpoint device of the sender via a plurality of text messages, wherein the location information of the endpoint device of the individual is updated for each of the plurality of text messages and sent to the endpoint device of the sender, wherein the endpoint device of the individual is distinct from the network device.

15. The non-transitory computer-readable storage device of claim 14, wherein the first text message comprises a short message service text message.

16. The non-transitory computer-readable storage device of claim 14, wherein the indication comprises a key word.

17. The non-transitory computer-readable storage device of claim 14, wherein the indication comprises a predefined code in the first text message.

18. The non-transitory computer-readable storage device of claim 14, wherein the location information comprises an address and turn-by-turn directions that are included in each of the plurality of text messages that is sent to the endpoint device of the sender.

19. The non-transitory computer-readable storage device of claim 14, wherein the location information is provided in a map application that is launched on the endpoint device of the sender with turn-by-turn directions.

20. An apparatus for processing a first text message, the apparatus comprising:
   a processor in an application server deployed in a communication network; and
   a non-transitory computer-readable medium storing a plurality of instructions which, when executed by the processor, cause the processor to perform operations, the operations comprising:
      receiving over the communication network the first text message;
      analyzing the first text message for an indication that a sender of the first text message is requesting location information of an endpoint device of an individual that the first text message is addressed to;
      receiving a permission to provide the location information of the endpoint device of the individual;
      obtaining the location information of the endpoint device of the individual from a network device deployed in the communication network; and
      transmitting over the communication network the location information of the endpoint device of the individual to an endpoint device of the sender via a plurality of text messages, wherein the location information of the endpoint device of the individual is updated for each of the plurality of text messages and sent to the endpoint device of the sender, wherein the endpoint device of the individual is distinct from the network device.

* * * * *